United States Patent [19]

Lat et al.

[11] Patent Number: 4,964,774

[45] Date of Patent: Oct. 23, 1990

[54] COATED METAL FASTENER

[75] Inventors: Geronimo E. Lat, Prospect Heights; Willaim L. Gabriel, Barrington, both of Ill.

[73] Assignee: Illinois Tool Works Inc., Glenview, Ill.

[21] Appl. No.: 414,793

[22] Filed: Sep. 29, 1989

[51] Int. Cl.$^5$ .............................................. F16B 15/00
[52] U.S. Cl. .................... 411/446; 411/466; 411/903
[58] Field of Search ............... 411/446, 902, 903, 908, 411/466, 487; 428/423.1

[56] References Cited

U.S. PATENT DOCUMENTS

| | | | |
|---|---|---|---|
| 3,853,606 | 12/1974 | Parkinson | 411/903 |
| 4,307,000 | 12/1981 | Vasta | 428/423.1 |
| 4,837,090 | 6/1989 | Hyner et al. | 411/903 |

FOREIGN PATENT DOCUMENTS 1921753 11/1970 Fed. Rep. of Germany ...... 411/903

Primary Examiner—Neill R. Wilson
Attorney, Agent, or Firm—Dressler, Goldsmith, Shore, Sutker & Milnamow, Ltd.

[57] ABSTRACT

A metal fastener, suitable for use in wood construction and coated with a polymeric residue produced by removing water from an aqueous dispersion of a film-forming, thermoplastic, predominately aliphatic polyurethane resin, thereby to reduce penetration force, increase withdrawal force, and protect against corrosion. Before the polyurethane coating is applied, a zinc layer is applied so as to coat the fastener, and a chromate conversion layer is applied so as to coat the zinc layer.

10 Claims, 1 Drawing Sheet

FIG. 1
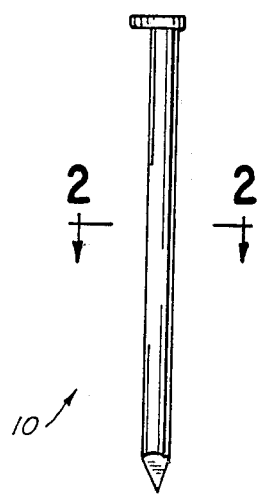
FIG. 2
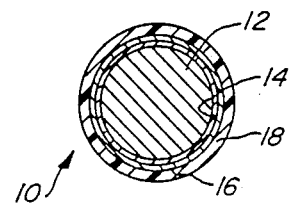
FIG. 4
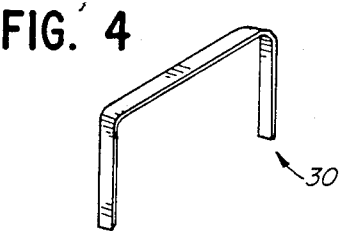
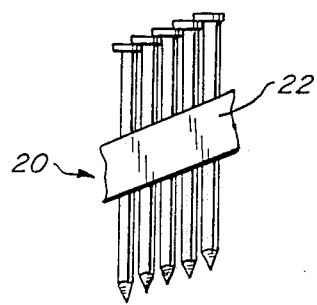
FIG. 3
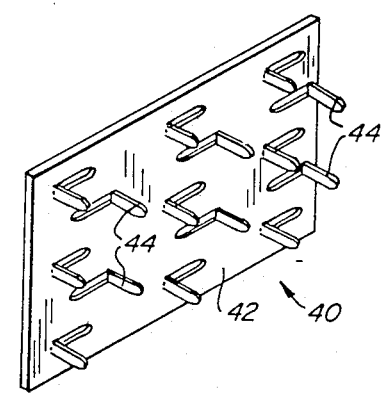
FIG. 5

COATED METAL FASTENER

TECHNICAL FIELD OF THE INVENTION

This invention pertains to a metal fastener, such as a nail, staple, or truss plate, which exhibits excellent properties including a reduced penetration force, an increased withdrawal force, and a reduced corrosion tendency. This invention also pertains to a method of coating such a fastener so as to provide the foregoing properties.

BACKGROUND OF THE INVENTION

Generally, it is known to protect various metal fasteners and other metal articles against corrosion by electroplating their surfaces with zinc and chromating the electroplated surfaces. Moreover, it is known to cover the chromated surfaces with polymeric materials.

In Palisin, Jr., U.S. Pat. Nos. 3,790,355 and 3,977,839, hydrophobic, thermosetting polymers made from coating compositions containing hexamethoxy methyl melamine are proposed for covering such chromated surfaces. In Labenski et al. U.S. Pat. No. 4,003,760, so-called fluoroplastic materials, such as polytetrafluoroethylene, are proposed for covering such chromated surfaces.

Parkinson et al. U.S. Pat. No. 3,853,606 discloses a coating composition that is described therein as combining properties of increased holding power, corrosion resistance, and lubrication. The coating composition contains two thermoplastic resins, namely a flexible carboxyl or substituted carboxyl-containing resin and rosin-like resin. An organic solvent is required, which is undesirable in an industrial environment because such a solvent produces hazardous vapors and hazardous wastes.

Metal fasteners used in wooden construction present special requirements, for which polymeric materials used to protect metal articles of other types may not be well suited. These fasteners include nails, staples, and truss plates. Typically, the metal of such fasteners is carbon steel.

Desirably, a polymeric material covering a metal fastener used in wood construction should serve not only to protect the fastener against corrosion but also to cause the fastener to exhibit an increased withdrawal force when the fastener has been driven into a wooden workpiece. Withdrawal force, which may be also discussed in terms of holding power, is the force that is required to withdraw such a fastener from a given workpiece.

Furthermore, a polymeric material covering a metal fastener used in wood construction should resist chipping or tearing away, particularly when the fastener is struck by a driving element of a pneumatically powered, combustion-powered, or other rapidly acting fastener-driving tool.

Optimally, a polymeric material covering a metal fastener used in wood construction would serve moreover to cause the fastener to exhibit a decreased penetration force when the fastener is driven into a wooden workpiece. Penetration force is the force required to drive such a fastener into a given workpiece.

However, it is difficult to identify a polymeric material that would not require an organic solvent when applied to such a fastener and that would serve not only to protect the fastener against corrosion, to cause the fastener to exhibit an increased withdrawal force, and to resist chipping or tearing away, but also to cause the fastener to exhibit a reduced penetration force.

Although known coatings for metal articles may be generally satisfactory in many applications, there has been a need, to which this invention is addressed, for improved coatings for metal fasteners, particularly for metal fasteners suitable for wood construction, such as nails, staples, or truss plates.

SUMMARY OF THE INVENTION

This invention provides a metal fastener having a coating that does not require an organic solvent when applied to the fastener and that reduces penetration force, increases withdrawal force, resists chipping or tearing away, and protects against corrosion. This invention also provides a method for applying such a coating to a metal fastener.

This invention is applicable particularly but not exclusively to a metal fastener of a type made of carbon steel and suitable for wood construction. Preferably, the fastener is a nail, staple, or truss plate. However, fasteners made of aluminum and fasteners made of copper alloys, such as bronze, are equally well suited for the practice of this invention.

According to this invention, the fastener is coated with a thermoplastic, polymeric residue that contains a predominately aliphatic polyurethane. The thermoplastic, polymeric residue provides a tough, adherent coating that reduces penetration force, increases withdrawal force, resists chipping or tearing away, and protects against corrosion. The thermoplastic, polymeric residue is produced by drying a film-forming, predominately aliphatic polyurethane resin applied to the fastener in a liquid medium, preferably an aqueous medium. Thus, the polymeric coating does not require an organic solvent when applied to the fastener.

The liquid medium that contains the resin is applied, as by dipping, spraying, roller coating, or like expedients, so as to coat a substantial part of the fastener, preferably the entire fastener. The liquid then is removed at an elevated temperature so as to form a film from the resin that is present on the fastener. Water is the preferred liquid medium for the resin.

For enhanced anti-corrosion properties, a metal fastener embodying the present invention can be galvanized in an electroplating or hot-dip process or otherwise precoated with a zinc layer prior to application of the thermoplastic, predominately aliphatic polyurethane coating thereto. A chromate conversion layer can also be provided, if desired, over the zinc layer prior to application of the ultimate or outermost polyurethane coating of the type hereinabove described to the metal fastener.

The zinc and chromate conversion layers, if present, serve to provide corrosion protection in the event of localized chipping or tearing away of the aforesaid aliphatic polyurethane outermost coating as the metal fastener embodying the present invention is used. Such layers, if present, also provide corrosion protection if and where such ultimate or outermost coating does not completely cover the metal fastener.

A coated fastener according to this invention exhibits excellent properties including a reduced penetration force, an increased withdrawal force, and excellent protection against corrosion. The present fasteners are particularly well suited for use with wood that can be easily stained, such as cedar or redwood, and with wood that has been chemically treated, e.g., copper-chromium-arsenate treated.

These and other objects, features, and advantages of this invention are evident from the following description of a preferred embodiment of this invention with reference to the accompanying drawings.

BRIEF DESCRIPTION OF THE DRAWINGS

FIG. 1 is an elevational view of a nail constituting a preferred embodiment of this invention.

FIG. 2 is a cross-sectional view on a slightly larger scale, as taken along plane 2—2 of FIG. 1 in a direction indicated by arrows.

FIG. 3 is a fragmentary, elevational view on a slightly smaller scale, showing a collated strip of nails similar to the nail of FIG. 1.

FIG. 4 is a perspective view of a staple constituting an alternative embodiment of this invention.

FIG. 5 is a simplified, perspective view of a truss plate constituting a further embodiment of this invention.

DETAILED DESCRIPTION OF ILLUSTRATED EMBODIMENTS

According to this invention, a metal fastener suitable for use in wood construction has a thermoplastic, predominately aliphatic polyurethane coating over substantially its entire metal surface. The coating resists chipping or tearing away and causes the fastener to exhibit excellent properties including a reduced penetration force, an increased withdrawal force, and a reduced corrosion tendency. The coated fastener is particularly well suited for use with wood that can be easily stained, such as cedar or redwood, and with wood that has been chemically treated, e.g., copper-chromium-arsenate treated.

The polyurethane coating is a polymeric residue that is produced by removing water from an aqueous dispersion of a film-forming, thermoplastic, predominately aliphatic polyurethane resin, as specified below.

Preferably, the aqueous dispersion is applied by dipping the nail into the aqueous dispersion so as to coat the fastener. The aqueous dispersion can be alternatively applied by spraying, roller coating, or like expedients, so as to coat the fastener.

After the fastener has been coated with the aqueous dispersion, the coated fastener is heated so as to remove water from the aqueous dispersion, thereby to form a film of the polymeric residue. The polymeric residue provides a tough, adherent, polymeric film that protects the fastener against corrosion, resists chipping or tearing away, and causes the fastener to exhibit a reduced penetration force as well as an increased withdrawal force.

Preferably, before the polymeric coating is applied thereto, the fastener is galvanized in an electroplating or hot-dip or otherwise precoated with a zinc layer, over which a chromate conversion layer is applied. The zinc and chromate conversion layers on the fastener protect the fastener against corrosion in the event of localized chipping or tearing away of the thermoplastic, predominately aliphatic polyurethane coating, which constitutes the ultimate or outermost coating on the fastener. The zinc and chromate conversion layers also protect the fastener against corrosion of and where such ultimate or outermost coating does not completely cover the fastener.

The zinc layer may be conveniently applied by a known electroplating process. Preferably, the zinc layer has a thickness of about 0.2 to about 0.6 mil, more preferably about 0.5 mil so as to comply with Federal Building Code FF-N-105B, which is referenced to American Society for Testing Materials (ASTM) Specification A641, Class 1, Type 2. Suitable electroplating processes are known in the art. See, e.g., Lowenheim, Ed., *Modern Electroplating*, John Wiley & Sons, Inc., New York (1974) at Chapter 16.

The chromate conversion layer may be conveniently applied by a known chromating process. Preferably, a golden yellow (yellow iridescent) chromate conversion layer is applied. A dark olive drab, or dark black chromate conversion layer may be alternatively applied, if desired. Suitable chromating processes are known in the art. See, e.g., Mohler, *Electroplating and Related Processes*, Chemical Publishing Co., Inc., New York (1969) at Chapter 14. Also suitable for this purpose is the chromate conversion layer provided by the Alodine process described in Spruance, Jr., U.S. Pat. No. 2,438,877.

Preferably, the polymeric coating is applied within about two weeks after the zinc and chromate conversion layers are applied. In some instances, if the polymeric coating is not applied until later than about two weeks after the zinc and chromate conversion layers are applied, a bond of reduced adhesive strength tends to form between the chromate conversion layer and the polymeric coating. The applied chromate conversion layer, if more than about two weeks old, can be rejuvenated by a chemical post-treatment, however. For this purpose, an aqueous sulfuric acid dip can be employed or an aqueous solution of sodium dichromate acidified with sulfuric acid.

It is believed that the polymeric coating, which is thermoplastic, fuses partially as the nail or other fastener is driven, because of friction-generated heat, but resolidifies quickly. It is also believed that, while it is fused partially, the polymeric coating acts as a lubricant so as to reduce penetration force. It is further believed that, as the polymeric coating resolidifies, the polymeric coating bonds mechanically to wood fibers surrounding the fastener so as to increase withdrawal force.

Where the polymeric coating remains intact, the polymeric coating together with the zinc and chromate conversion layers protect the nail or other fastener against corrosion. In regions where the polymeric coating has chipped or torn away, as where the nail or other fastener has been struck by a driving element of a fastener-driving tool, the zinc and chromate conversion layers nevertheless protect the nail or other fastener against corrosion.

As an alternative to or as an adjunct to such zinc and chromate conversion layers, a protective coating of a different type may be applied so as to cover the metal surfaces of the nail or other fastener, before the polymeric coating noted above is applied. The protective coating may be a zinc phosphate layer or an iron phosphate layer. Such a phosphate layer may be applied by dipping the nail or other fastener into a phosphating bath of a suitable composition. Alternatively, the protective coating may be a layer of tin, zinc, aluminum, or stainless steel, as applied to the metal surfaces of the nail or other fastener in a flame-spraying or plasma-spraying process.

The polymeric coating can be advantageously used with any type of wood. The polymeric coating provides excellent results with wood that stains easily, such as cedar or redwood, and with wood that has been chemically treated, e.g., copper-chromium-arsenate treated.

A coated fastener according to this invention is superior to other fasteners used in wood construction in that a coated fastener according to this invention exhibits a reduced penetration force, an increased withdrawal force, and a reduced corrosion tendency.

A coated nail 10, as shown in FIGS. 1 and 2, constitutes a preferred embodiment of this invention.

The coated nail 10 has a metal body 12, which is made of carbon steel, preferably AISI C 1008 steel. Its metal surfaces are covered completely with an inner zinc layer 14, an intermediate chromate conversion layer 16, and an outer, thermoplastic, predominately aliphatic polyurethane coating 18.

The inner zinc layer 14, as applied by a known electroplating process, has a thickness of at least 0.5 mil so as to comply with Federal Building Code FF-N-105B, which is referenced to ASTM Specification A641, Class 1, Type 2. Preferably, as applied over the inner zinc layer 14 by a known chromating process, the chromate conversion layer 16 is a golden yellow (yellow iridescent) chromate conversion layer. A dark olive drab or dark black chromate conversion layer may be alternatively applied over the zinc layer 14, if desired.

As applied over the zinc and chromate conversion layers by the method disclosed herein, preferably within about two weeks after such layers are applied, the outer polyurethane coating 18 has a thickness of approximately 0.5 mil.

As shown in FIG. 3, a plurality of coated nails 20, each of which is similar to the coated nail 10, are collated into a strip, which fits a magazine (not shown) of a fastener driving tool, by a pair of collating tapes 22 (one shown) generally as disclosed in Langas et al. U.S. Pat. No. 3,276,576. The coated nails 20 are situated between the collating tapes 22 and are adhesively attached thereto.

The metal surfaces of each coated nail 20 are covered completely with an inner zinc layer 14, as described above, and with an intermediate chromium conversion layer, as described above. The zinc and chromate conversion layers are applied to each coated nail 20 before such coated nail 20 is situated between and attached adhesively the collating tapes 22.

Moreover, the metal surfaces of each coated nail 20 are covered at least substantially with an outer, thermoplastic, predominately aliphatic polyurethane coating, as described above. Preferably, a continuous outer polyurethane coating is applied to each coated nail 20 before such coated nail 20 is attached adhesively to and between the collating tapes 22. However, the outer polyurethane coating may be alternatively applied to each coated nail 20 after such coated nail 20 has been attached adhesively to and between the collating tapes 22, in which event the outer polyurethane coating on such coated nail 20 is discontinuous in regions where such coated nail 20 is masked by adhesive on the collating tapes 22.

Furthermore, this invention may be advantageously applied to such coated nails (not shown) collated by other known types of collating media, such as polymeric collating media or welded collating wires.

A coated staple 30, as shown in FIG. 4, constitutes yet another embodiment of this invention.

The coated staple 30 has a metal body, which is made of carbon steel, preferably AISI C 1008 steel. Its metal surfaces are covered completely with an inner zinc layer, as described above, an intermediate chromate conversion layer, as described above, and an outer, thermoplastic, predominately aliphatic polyurethane coating, as described above.

The coated staple 30 may be one of a series (not shown) of similar staples that are collated. The outer, thermoplastic, predominately aliphatic polyurethane coating on each of such staples including the coated staple 30 may be advantageously used to collate such staples by being applied to such staples after such staples have been placed in a series, in side-to-side relation to one another.

A coated truss plate 40, as shown in FIG. 5, constitutes yet another embodiment of this invention.

The coated truss plate 40 is formed from a planar member 42, from which a plurality of pointed teeth 44 are struck. The truss plate 40 usually is made of carbon steel, such as AISI C 1008 steel. Preferably, the truss plate 40 is covered in its entirety with an inner zinc layer, as described above, an intermediate chromium conversion layer, as described above, and an outer, thermoplastic, predominately aliphatic polyurethane coating, as described above.

The coated truss plate 40 may be alternatively made from a galvanized, i.e., zinc-coated, steel sheet, which sheet has been galvanized in a hot-dip or other process. When the teeth 44 are struck from the planar member 42, the edges of the teeth 44 and the edges of the openings left in the planar member 42 by the teeth 44 are exposed without any zinc coating on the exposed edges. To provide corrosion protection for the exposed edges, the truss plate 40 may be then immersed in a phosphating bath so as to apply a phosphate coating on the exposed edges as well as on the other parts of the metal body. A zinc phosphate coating is preferred. An iron phosphate coating may be alternatively applied. Next, an intermediate chromate conversion layer, as described above, and an outer, thermoplastic, predominately aliphatic polyurethane coating, as described above, are applied to the truss plate 40 in its entirety. The intermediate chromium conversion layer may be optionally omitted.

The preferred polymeric coating materials contemplated by this invention are water-dispersible, thermoplastic polymers that contain as a major constituent thereof a film-forming aliphatic polyurethane that may or may not be blocked. The novel fasteners embodying this invention have their surfaces in contact with the polymeric residue produced, as mentioned above, by removing water from an aqueous dispersion of a film-forming, thermoplastic, predominantly aliphatic polyurethane resin. The term "aliphatic", as used herein and in the appended claims, encompasses straight-chain aliphatic as well as alicyclic or cycloaliphatic polyurethane resins. Upon drying at an elevated temperature, these aliphatic polyurethane resins form a film that may include crosslinked aliphatic polyurethane chains.

The film-forming, thermoplastic polyurethane resin compositions based on predominantly aliphatic components and thus suitable for practicing the present invention are aqueous dispersions, i.e., emulsions or solutions, of aliphatic polyurethane polymers that are the reaction products of a linear, branched, or cyclic aliphatic isocyanate with a linear, branched or cyclic aliphatic polyhydroxylated organic compound, e.g., a polyol such as ethylene glycol, penetanediol, diethylene glycol, and the like, or a hydroxyl-terminated polyether or polyester, such a poly(oxytetramethylene)diol, and the like.

The term "predominantly aliphatic", as used herein and in the appended claims, denotes a resin that may contain a minor amount of an aromatic material as long as such material does not permit light-degradation of the polyurethane so as to cause an unacceptable or non-aesthetic degree of discoloration or coating discontinuity. Anionic or non-ionic surfactants are usually present in these dispersions.

Particularly suitable aqueous, aliphatic, polyurethane resin-containing dispersions suitable for the present purposes include NeoRez XR-9637 TM aqueous dispersions and blends of NeoRez XR-9637 TM with a minor amount of a NeoCryl A-600 TM series aqueous acrylic dispersion, all commercially available from ICI Resins (Polyvinyl Chemical Industries), Wilmington, Mass. These dispersions are formed by dissolving the film-forming aliphatic polyurethane resin, or prepolymer, in a suitable non-reactive organic solvent for the resin, adding a sufficient amount of the surfactant having the appropriate hydrophylic-lipophylic balance (HLB) value, and then gradually mixing the obtained solution with sufficient water to form a stable emulsion of droplets of the produced solution in water. The emulsion may contain accelerators, if desired, as well as optional cross-linking agents such as water-reducible hexamethoxylated melamine resins or the like.

The foregoing dispersions are thermoplastic polyurethane resin lattices of a relatively high molecular weight, aliphatic, isocyanate-based, film-forming thermoplastic elastomer in a water dispersion with an anionic or non-ionic surfactant.

Blocked film-forming aliphatic polyurethane resins suitable for present purposes are formed by the reaction of an aliphatic polyisocyanate, e.g., 1,6-hexamethylene diisocyanate (HDI), 4'-diisocyanatodicyclohexylmethane (HMDI), isophorone diisocyanate (IPDI), or the like, adducts of polyol or hydroxyl-terminated polyether or hydroxyl-terminated polyester resins with an end-blocking compound containing active hydrogen atoms, such as an amide or a polyamide, in accordance with conventional techniques for the production of blocked polyurethane resins. Illustrative of these resins are Rucothane Latexes 2010L, 2030L, 2040L, and 2060L, all commercially available from Ruco Division of Hooker Chemical Corporation, Niagara Falls, N.Y., and the like.

The amount of the film-forming aliphatic polyurethane resin present in the aqueous coating composition is in the range of about 10 to about 50 percent by weight, based on the weight of the coating composition. The solids content can be adjusted to provide the desired viscosity for the coating composition. Preferably, a coating composition suitable for dipping contains about 20 to about 23 percent by weight of the aliphatic polyurethane resin, based on the weight of the coating composition.

The aqueous coating composition can be applied to the fastener in any convenient manner, e.g., by dipping, spraying, roller coating, or the like expedients, depending upon the nature and configuration of the fasteners involved. A preferred method of application, suitable for use with a wide variety of fasteners, is dipping.

The aqueous coating composition is applied to the fastener so as to provide, after drying a film-like solids deposit that is present on the fastener as a substantially continuous film encasing the fastener and having a thickness of about 0.2 mil to about 2 mils. A preferred coating thickness is about 0.5 mil.

Drying, and possible curing, of the aliphatic polyurethane resin deposited on the fastener is effected by drying the coated fasteners at a temperature of about 145° F., or higher, but below the degradation temperature of the cured aliphatic polyurethane. Preferably, the temperature is in a range of from about 145° F. to about 155° F. More preferably, the temperature is about 150° F. The degree of cross-linking in a particular instance is dependent upon the specific composition of the film-forming aliphatic polyurethane resin aqueous dispersion and the cross-linking agent, and/or accelerators that may be present.

One example of carrying out the improved method of this invention is described below. Nails made of AISI C 1008 steel are cleaned in an alkaline bath, rinsed, pickled in an acidic bath, rinsed, galvanized, and rinsed. The nails are galvanized so as to comply with ASTM Specification A641, Class 1, Type 2. Next, a chromate conversion layer is applied to the nails. Thereafter, the thus treated nails are rinsed and over-cured.

Next, these nails are collated into strips by means of adhesive tapes. The collated nails are preheated in a preheating zone at a temperature in a range of about 105° F. to about 140° F. The preheated strips are dipped into an aqueous coating composition containing about 20 to about 23 percent by weight of the aliphatic polyurethane resin (NeoRez XR-9637 TM), based on the weight of the coating composition, to provide a dry coat thickness of about 0.35 mil to about 0.55 mil. The coating composition has a viscosity of about 34 to about 38 seconds, measured with a No. 1 Zahn cup. Air jets are used to remove excess of the coating composition and also to drive the coating composition into regions covered by the collating tapes.

The collated nails, as coated by the coating composition noted above, are heated in a heating zone, by infrared lamps, to a temperature of about 145° F. to about 155° F. Residence time in the heating zone is about 15 seconds. A tough, adherent coating is formed on the nails during heating.

Next, the collated nails are removed from the heating zone and are cooled in a cooling zone by circulating air at room temperature. Circulation is effected by blowers. The collated and cooled nails are then packaged.

Various modifications may be also made in the novel fastener provided by this invention, or in the novel method provided by this invention, without departing from the scope and spirit of this invention, as defined in the appended claims.

We claim:

1. A metal fastener suitable for use in wood construction, having a thermoplastic, predominately aliphatic polyurethane coating over substantially its entire metal surface, and provided with a zinc layer and a chromate conversion layer between said polyurethane coating and the metal surface of the fastener, said zinc layer being contiguous with the metal surface of the fastener.

2. The metal fastener in accordance with claim 1 wherein said polyurethane coating is continuous.

3. The metal fastener in accordance with claim 1 wherein said polyurethane coating is discontinuous.

4. The metal fastener in accordance with claim 1 wherein the zinc layer has a thickness in the range of about 0.2 to about 0.6 mil.

5. The metal fastener in accordance with claim 1 wherein the polyurethane coating overlying the zinc layer and the chromate conversion layer has a thickness in the range of about 0.2 to about 2 mils.

6. The metal fastener in accordance with claim 1 wherein the polyurethane coating overlying the zinc layer and the chromate conversion layer has a thickness of about 0.5 mil.

7. The metal fastener in accordance with claim 1 which is a nail.

8. The metal fastener in accordance with claim 1 which is a staple.

9. The metal fastener in accordance with claim 1 which is a truss plate.

10. The metal fastener in accordance with claim 1 wherein the metal is carbon steel.

* * * * *